United States Patent

Cotton III et al.

(10) Patent No.: US 6,959,732 B2
(45) Date of Patent: Nov. 1, 2005

(54) HARD COATING ON A STATOR FOR IMPROVING THE DURABILITY OF A SOLENOID ACTUATOR

(75) Inventors: Clifford E. Cotton III, Pontiac, IL (US); Alan R. Stockner, Metamora, IL (US); Ronald D. Shinogle, Peoria, IL (US); Olaf Ohligschläger, Grünebach (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/372,568

(22) Filed: Feb. 21, 2003

(65) Prior Publication Data

US 2004/0163721 A1 Aug. 26, 2004

(51) Int. Cl.[7] .............................................. F16K 31/06
(52) U.S. Cl. ........................... 137/625.65; 251/129.16; 335/281
(58) Field of Search ............... 137/625.65; 251/129.16; 335/281

(56) References Cited

U.S. PATENT DOCUMENTS

| | | | | |
|---|---|---|---|---|
| 3,368,791 A | * | 2/1968 | Wells .................... 251/129.16 |
| 3,573,690 A | * | 4/1971 | Jones et al. .................. 333/281 |
| 4,579,145 A | * | 4/1986 | Leiber et al. ........... 137/625.65 |
| 4,669,504 A | * | 6/1987 | Fujitsugu et al. ...... 137/625.65 |
| 5,208,570 A | * | 5/1993 | Nippert ...................... 333/261 |
| 5,738,075 A | | 4/1998 | Chen et al. |
| 5,937,904 A | * | 8/1999 | Wunder ................. 137/625.65 |
| 5,992,821 A | * | 11/1999 | Rookes et al. ........... 251/129.1 |
| 6,386,220 B1 | * | 5/2002 | Koenings ............... 137/625.65 |
| 2002/0000247 A1 | * | 1/2002 | Cusac et al. ................. 137/375 |

* cited by examiner

Primary Examiner—Gerald A. Michalsky
(74) Attorney, Agent, or Firm—Liell & McNeil

(57) ABSTRACT

At least one solenoid actuator and a valve are at least partially positioned within a body of an hydraulic device. The solenoid actuator includes at least one solenoid coil mounted to a stator that defines a guide bore in which a push pin moves between a first position and a second position. The valve includes a valve member that is operably coupled to move with the push pin. The push pin is attached to an armature that is positioned adjacent the solenoid coil. In order to increase the durability of the solenoid actuator, a relatively hard, nonmagnetic material is positioned between an inner surface of the stator that is made from a relatively soft, magnetic material and an outer surface of the push pin.

18 Claims, 4 Drawing Sheets

HARD COATING ON A STATOR FOR IMPROVING THE DURABILITY OF A SOLENOID ACTUATOR

TECHNICAL FIELD

The invention relates generally to hydraulic devices, and more particularly to method for improving the durability of solenoid actuators utilized with the hydraulic devices.

BACKGROUND

In several diesel engines today, fluid control valves regulate the flow of actuation fluid to hydraulically actuated devices, such as hydraulically actuated fuel injectors and hydraulically actuated gas exchange valves, such as engine compression release brakes. Depending on the positioning of a valve member, the fluid control valve either connects the hydraulic device to a source of high pressure actuation fluid causing the device to activate, or connects the hydraulic device to a low pressure actuation reservoir causing the device to deactivate, reset itself, or remain inactive. Typically, the movement of the valve member is controlled by a solenoid actuator. For instance, hydraulically actuated fuel injectors such as that shown in U.S. Pat. No. 5,738,075 issued to Chen et al. on Apr. 14, 1998, include a solenoid driven fluid control valve that is attached to an injector body.

While the method of using a solenoid actuator to control a fluid control valve has performed well, there is room for improvement. For instance, the solenoid actuator includes a solenoid coil mounted to a stator. In some actuators, the stator is comprised of a relatively soft, magnetic material that aids in conducting the magnetic flux creating the energized solenoid coil. The stator defines a guide bore in which a push pin, which is operably coupled to the valve member, moves between a first and a second position. Because an outer surface of the moveable push pin makes contact with the inner surface of the stator, the movement of the push pin within the guide bore causes the relatively soft, magnetic material of the stator to wear. Over time, the rubbing of the relatively hard, nonmagnetic push pin against the relatively soft, magnetic stator decreases the durability of the solenoid actuator. Further, the relatively soft, magnetic material comprising the stator is worn by debris trapped between the outer surface of the moving push pin and the inner surface of the stator. This wear on the stator also decreases the durability of the solenoid actuator.

In addition to the rubbing between the outer surface of the push pin and the inner surface of the stator, there may be undesirable contact between the valve body and the moving valve member. The magnetic flux created by the energized solenoid coil is often asymmetrical, causing the push pin to misalign within the guide bore. The asymmetrical magnetic flux can cause the misalignment of the valve member and undesirable side forces if the valve member is attached to the push pin. A misaligned valve member can rub against the valve body causing the valve member and the valve body to wear and reduce its actuation speed.

The present invention is directed to overcoming one or more of the problems as set forth above.

SUMMARY OF THE INVENTION

In one aspect of the present invention, a hydraulic device includes a hydraulic device body in which at least one solenoid actuator is at least partially positioned. The solenoid actuator includes a stator comprised of a relatively soft, magnetic material. An inner surface of the stator defines a guide bore in which a push pin is movable between a first position and a second position. There is a relatively hard, nonmagnetic material positioned between an outer surface of the push pin and the inner surface of the stator. An armature is positioned adjacent to the solenoid coil and is attached to the push pin. The hydraulic device also includes at least one valve having a valve member that is operably coupled to the push pin.

In another aspect of the present invention, there is a solenoid actuator including a stator that is comprised of a relatively soft, magnetic material. An inner surface of the stator defines a guide bore, in which a push pin is movable between a first position and a second position. There is a relatively hard, nonmagnetic material positioned between the inner surface of the stator and an outer surface of the push pin. A solenoid coil is mounted within the stator, and an armature is positioned adjacent to the solenoid coil. The armature is attached to the push pin.

In yet another aspect of the present invention, there is a method of increasing the durability of a solenoid actuator by positioning a relatively hard, material between an inner surface of a relatively, soft stator and an outer surface of a push pin.

DETAILED DESCRIPTION

Figure 1:
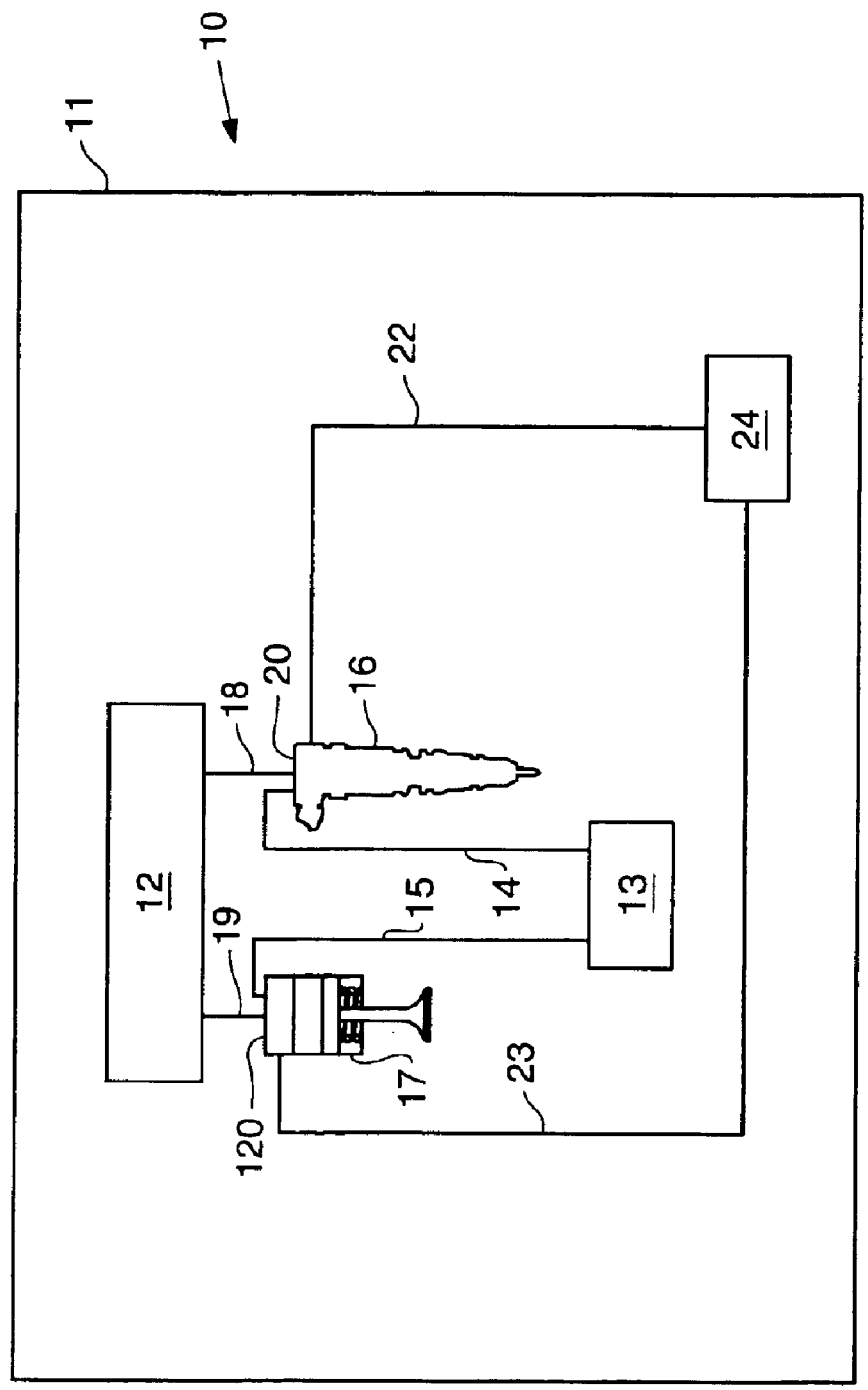
FIG. 1 is a schematic representation of an engine according to the present invention.

Referring to FIG. 1, there is shown a schematic representation of an engine 10 according to the present invention. The engine 10 includes an engine housing 11 to which a low pressure actuation fluid reservoir 13 is attached. The low pressure actuation fluid reservoir 13 preferably is an engine pump that includes an amount of low pressure engine lubricating oil. While low pressure actuation fluid reservoir 13 is preferably an oil pan that has engine lubricating oil, it should be appreciated that other fluid sources having an amount of available fluid, such as coolant, transmission fluid or fuel, could instead be used. A source of high pressure actuation fluid 12 is also attached to the engine housing 11. High pressure actuation fluid flowing out of the source of high pressure actuation fluid 12 is delivered to an engine brake 17 via an engine brake supply line 19 and to a fuel injector 16 via a fuel injector supply line 18. Once the high pressure actuation fluid has performed its work in either the engine brake 17 and the fuel injector 16, the actuation fluid is returned to the low pressure actuation fluid reservoir 13 via an engine brake drain line 15 and a fuel injector drain line 14, respectively. Both the fuel injector 16 and the engine brake 17 include a fluid control valve assembly 20, 120. Both fluid control valve assemblies 20, 120 perform similarly within the fuel injector 16 and the engine brake 17. The fluid control valve assembly 20 within the fuel injector 16 controls the flow of actuation fluid entering the fuel injector 16 via the supply line 18 and exiting the fuel injector 16 via the drain line 14. The fuel injector fluid control valve assembly 20 is in electrical communication with an electronic control module 24 via a fuel injector communication line 22. The fluid control valve assembly 120 within the engine brake 17 controls the flow of actuation fluid entering the engine brake 17 via the supply line 19 and exiting the engine brake 17 via the drain line 15. The engine brake fluid control valve assembly 120 is in electrical communication with the electronic control module 24 via an engine brake communication line 23. Although the fluid control valve assemblies 20, 120 are illustrated in FIG. 1 as attached to the fuel injector 16 and the engine brake 17, those skilled in the art should appreciate that the fluid control valve assemblies 20, 120 could be separate from the fuel injector 16 and the engine brake 17 and positioned at a point within the hydraulic system, such as along the supply lines 19, 18. Further, rather than utilizing a fluid control valve assembly 20, 120 for each the fuel injector 16 and the engine brake 17, one valve assembly could control the flow of actuation fluid to and from both the engine brake 17 and the fuel injector 16. Also, those skilled in the art should appreciate that the fluid control valve assembly 20, 120 can be utilized to control the flow of actuation fluid to and from any hydraulic device.

Figure 2:
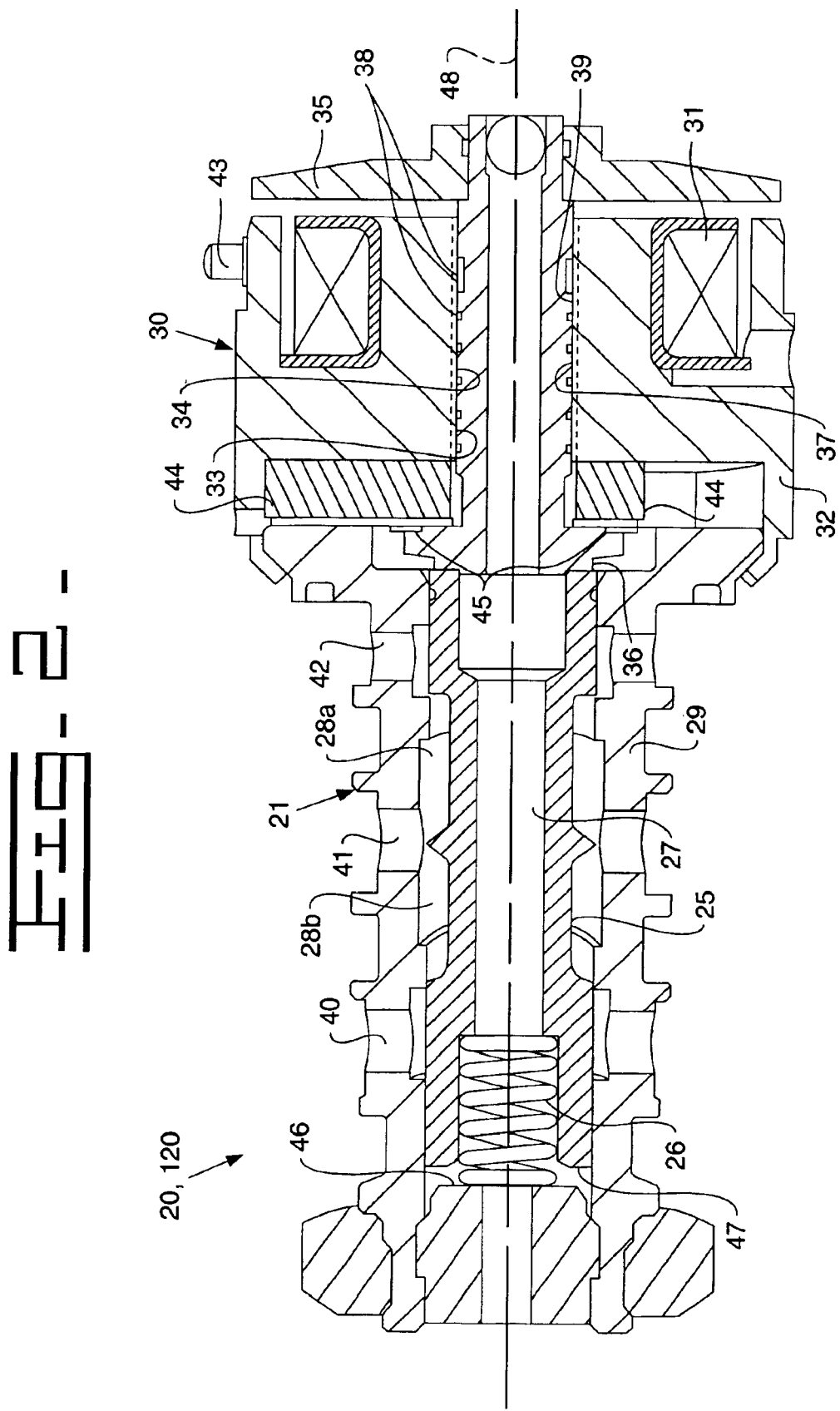
FIG. 2 is a sectioned side view of a valve assembly according to the present invention.

Referring to FIG. 2, there is shown a sectioned side view of the valve assembly 20, 120 according to the present invention. The valve assembly 20, 120 includes a solenoid actuator 30 and a fluid control valve 21. The valve 21 includes a valve body 29 which is preferably attached to a stator 32 of the solenoid actuator 30. The solenoid actuator 30 includes at least one solenoid coil 31 that is mounted in the stator 32, which is comprised of a relatively soft, magnetic material. Although the stator 32 is preferably steel, it can be comprised of any relatively soft, magnetic material that can channel the magnetic flux caused by the solenoid actuator 30. The stator 32 includes an inner surface 33 that defines a guide bore 34. A push pin 36 that is preferably comprised of a relatively hard, nonmagnetic material, such as brass, and is movable between a first position, as shown, and a second position within the guide bore 34. The push pin 36 preferably moves along a centerline 48 of the valve assembly 20, 120. An armature 35 is positioned adjacent to the solenoid coil 32 and attached to the push pin 36, preferably by fitting the relatively soft material comprising the armature 35 to the relatively hard material comprising the push pin 36. The attachment is completed by inserting a ball into one end of the push pin 36, causing deformation that secures the armature 35 to the push pin 36. The armature 35 is preferably positioned at a distance from the scator 32 such that the armature 35 is within the magnetic field of the energized solenoid coil 31, but will not make contact with the relatively soft, magnetic stator 32 when the push pin 36 is in its second position. Although the push pin 36 may be made from hard brass due to its wear resistance, any relatively nonmagnetic material possessing good wear properties could be utilized. An outer surface 37 of the push pin 36 preferably defines helical grooves 38, which aid in maintaining lubrication of the inner surface 33 of the stator 32 and removal of particles from within the guide bore 34. In order to reduce rubbing between the inner surface 33 of the relatively soft, magnetic stator 32 and an outer surface 37 of the relatively nonmagnetic push pin 36, a relatively hard, nonmagnetic material 39 is positioned between the outer surface 37 of the push pin 36 and the inner surface 33 of the stator 32. Although any relatively hard, nonmagnetic material could be positioned between the inner surface 33 of the stator 32 and the outer surface 37 of the push pin 36, the relatively hard, nonmagnetic material 39 preferably includes tungsten carbide. Further, the relatively hard, nonmagnetic material is preferably attached to the inner surface 33 of the stator 32 as a coating of tungsten carbide. Tungsten carbide is one of a group of preferred materials that can be applied because, during manufacturing, it can be uniformly applied in a thin layer, maybe on the order of about two microns thick, to the inner surface 33 of the stator 32. Alternatively, the relatively hard, nonmagnetic material 39 could be included in a sleeve, as shown with a dashed line, that is positioned between the inner surface 33 of the stator 32 and the outer surface 37 of the push pin 36. An electrical connector 43 is attached to the solenoid actuator 30.

The valve assembly 20, 120 includes a moveable spool valve member 25 which is biased into contact with the push pin 36 by a biasing spring 26. Although the valve member 25 is illustrated as spool valve member, it should be appreciated that the valve member 25 could be of a different shape or type, such as a poppet valve member. Further it should be appreciated that the valve body 29 and the spool valve member 25 could define any number of passages, even though the present invention is described for a three way valve. The spool valve member 25 defines an internal passage 27, a first annulus 28a, and a second annulus 28b. The valve body 29 defines a supply passage 40, an actuation passage 41, and a drain passage 42. The supply passage 40 is fluidly connected with a source of high pressure actuation fluid 12 via the supply lines 19, 18. The actuation passage 41 is in fluid communication with a piston driven by the hydraulic device. The drain passage 42 is in fluid communication with the low pressure actuation fluid reservoir 13 via the drain lines 14, 15. The spool valve member 25 is operably coupled to the push pin 36. Thus, the spool valve member 25 moves in a corresponding manner with the push pin 36. The spool valve member 25 preferably moves along the centerline 48 of the valve assembly 20, 120. The body of the spool valve member 25 also defines an annular groove that receives an o-ring that aids in sealing.

As illustrated, when the push pin 36 is in its first position, the spool valve member 25 is in its biased position by the action of the spring 26, and a stop surface 45 of the push pin 36 is resting against a plate 44 comprised of a relatively hard, nonmagnetic material and positioned between the push pin 36 and the stator 32. Further, when the push pin 36 is in its first position, the actuation passage 41 is in fluid communication with the low pressure actuation fluid reservoir 13 via the first annulus 28a, the drain passage 42 and the drain line 14, 15. When the push pin 36 is in its second position, the stop surface 45 of the push pin 36 is not in contact with the plate 44. The spool valve member 25 moves against the bias of the spring 26 such that the actuation passage 41 is in fluid communication with the source of high pressure actuation fluid 12 via the second annulus 28b, the supply passage 40, and the supply line 18, 19. Further, when the push pin 36 is in its second position, a stop surface 47 of the spool valve member 25 is in contact with a second stop 46. Because the spool valve member 25 is coupled to the push pin 36 rather than attached to the push pin 36, an asymmetrical magnetic force pulling the push pin 36 off the centerline 48 or a mechanical misalignment will not also pull the spool valve member 25 to move off the centerline 48.

Figure 3:
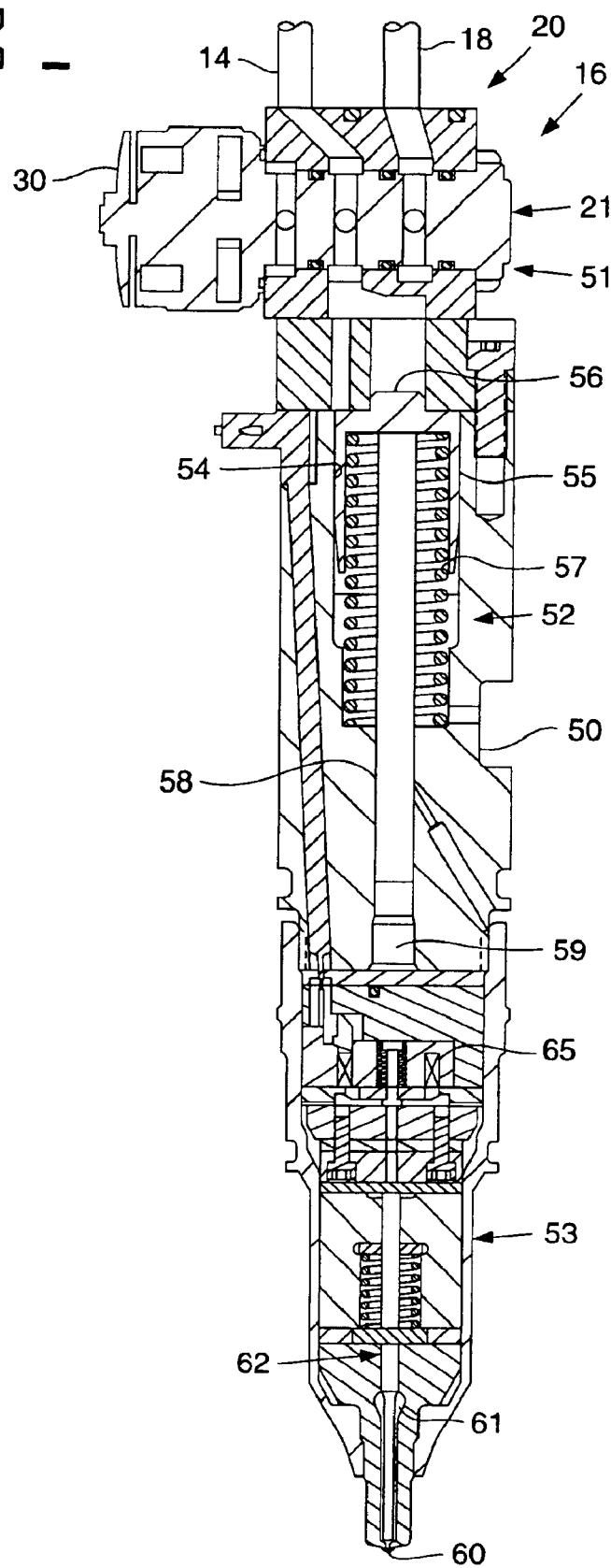
FIG. 3 is a sectioned side isometric view of a fuel injector according to the present invention.

Referring to FIG. 3, there is shown a sectioned side isometric view of a fuel injector 16 according to the present invention. A hydraulic device body, which in this instance is the injector body 50, of the fuel injector 16 includes a flow control portion 51, a pressure intensifying portion 52, and a nozzle portion 53. The control portion 51 includes the fluid control valve assembly 20, which is attached to the injector body 50. The actuation passage 41 of the fluid control valve 21 is fluidly connected to a piston bore 54 which is defined by the injector body 50. An intensifier piston 55 is movably positioned within the piston bore 54 and has a piston hydraulic surface 56 that is exposed to fluid pressure flowing from the actuation passage 41 to the piston bore 54. The intensifier piston 55 is biased toward a retracted, upward position as shown by a biasing spring 57. A plunger 58 is also moveably positioned in the injector body 50 and moves in a corresponding manner with the intensifier piston 55. When the push pin 36 of the solenoid actuator 30 is in its second position and the actuation passage 41 of the fluid control valve 21 is in fluid communication with the source of high pressure actuation fluid 12, the pressure acting on the piston hydraulic surface 56 is high, and the intensifier piston 55 is moved toward its advanced position. The plunger 58 also advances and acts to pressurize fuel within a fuel pressurization chamber 59. As illustrated, when the push pin 36 is in its first position and the actuation passage 41 of the flow control valve 21 is in fluid communication with the low pressure actuation reservoir 13, the pressure acting on the piston hydraulic surface 56 is low and the intensifier piston 55 is in its retracted, upward position under the action of the biasing spring 57. When the plunger 58 is returning to the upward position, fuel is draw into the fuel pressurization chamber 59 in preparation for the next injection event. The fuel pressurization chamber 59 is fluidly connected to nozzle outlets 60 via a nozzle supply passage 61. The opening and closing of the nozzle outlets 60 is controlled by a direct control needle valve 62 positioned in the nozzle portion 53 of the injector body 50. The direct control need valve 62 can be controlled by a separate solenoid actuator 65.

Figure 4:
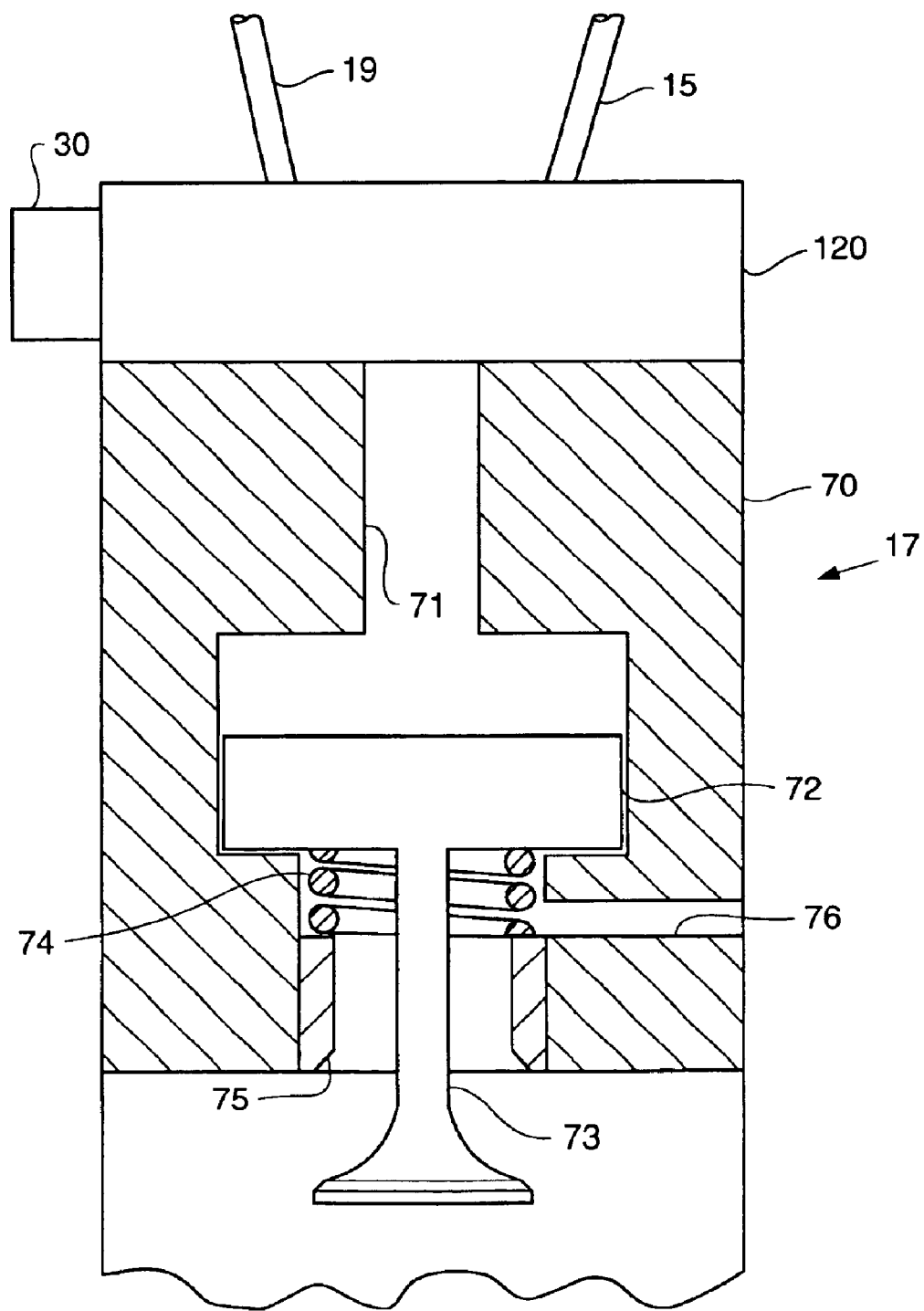
FIG. 4 is a sectioned side diagrammatic representation of an engine brake according to the present invention.

Referring to FIG. 4, there is shown a section side diagrammatic representation of the engine brake 17 according to the present invention. The engine brake 17 is preferably any gas exchange valve that is positioned in the engine 10 to vent compressed air within the engine cylinder (not shown) toward the end of a compression stroke for an engine piston. The engine brake 17 has a hydraulic device body, which in this instance is an engine brake body 70, that defines a fluid passage 71. The fluid control valve assembly 120 is attached to the engine brake body 70. The fluid passage 71 is fluidly connected to the actuation passage 41 of the flow control valve 21. A hydraulic actuator, piston 72, is positioned in the engine brake body 70 and is movable between a retracted, upward position and an advanced, downward position as shown. An engine brake valve member 73 moves in a corresponding manner with the piston 72. Piston 72 is biased toward its retracted position by a biasing spring 74. When the push pin 36 of the solenoid actuator 30 is in its first position causing the first annulus 28a of the spool valve member 25 to open fluid communication between the actuation passage 41 and the drain passage 42, the fluid passage 71 of the engine brake 17 is fluidly connected to the low pressure actuation fluid reservoir 13. The piston 72 will remain in its retracted position, and the engine brake valve member 73 closes the valve seat 75. When the push pin 36 of the solenoid actuator 30 is in its second position causing the spool valve member 25 to move correspondingly and open the second annulus 28b to fluid communication between the actuation passage 41 and the supply passage 40, the fluid passage 71 of the engine brake 17 is in fluid communication with the source of high pressure actuation fluid 12. The piston 72 pushes the engine brake valve member 73 downward to open the valve seat 75, allowing the engine compression release brake 17 to open the engine cylinder to an exhaust passage 76.

Industrial Applicability

Referring to FIGS. 1–4, the valve assembly 20, 120 control the flow of actuation fluid to and from the fuel injector 16 and the engine brake 17. Although the operation of the present invention will be discussed for one fuel injector 16 and one engine brake 17, it should be appreciated that the present invention can be utilized in an engine having any number of fuel injectors 16 or engine brakes 17 and could be utilized in other hydraulic devices, including others within the engine 10.

Referring to FIGS. 1–3, the application of the present invention with the fuel injector 16 will be discussed. Prior to an injection event, push pin 36 is in its first position biased against the action of the spring 26 (as shown in FIG. 2). The stop surface 45 of the push pin 36 is resting against the plates 44 which serve as a stop. Because the plates 44 are comprised of relatively hard, nonmagnetic material, the plates 44 protect the relatively soft, magnetic stator 32 from wear caused by repeated contact with the moving push pin 35. In its first position, the first annulus 28a of the spool valve member 25 is positioned such that the drain passage 42 is in fluid communication with the piston bore 54. Thus, because there is low pressure acting on the piston hydraulic surface 56 of the intensifier piston 55, the intensifier piston 55 and the operably coupled plunger 58 remain in their biased position and do not pressurize fuel within the fuel pressurization chamber 59.

In preparation for an injection event, the electronic control module 24 will energize the solenoid actuator 30 via the fuel injector communication line 22. Electric current will be passed through the solenoid coil 31 creating a magnetic flux that attracts the armature 35. Because the push pin 36 is attached to the armature 35, the push pin 36 will advance downward to its second position. The relatively nonmagnetic material preferably comprising the outer surface 37 of the push pin 36 may move against the relatively hard, nonmagnetic material 39, preferably a tungsten carbide coating attached to the inner surface 33 of the stator 32. Thus, contact between the relatively soft, magnetic material of the stator 32 and the outer surface 37 of the push pin 36 is reduced, or eliminated. Alternatively, a sleeve including a relatively hard, nonmagnetic material 39 could be positioned between the outer surface 37 of the push pin 36 and the inner surface 33 of the stator 32. When the push pin 36 advances to its second position, the outer surface 37 of the push pin 36 may make contact with the sleeve rather than the relatively soft, magnetic inner surface 33 of the stator 32. By reducing the contact between the relatively hard, nonmagnetic material comprising the push pin 36 and the relatively soft, magnetic material comprising the inner surface 33 of the stator 32 during the movement of the push pin 36 from first position to second position, the durability and longevity of the stator 32 can be increased.

Because the push pin 36 is operably coupled to the spool valve member 25 by the spring 26, the spool valve member 25 will move in a corresponding manner with the push pin 36. Although the push pin 36 could be operably coupled to the spool valve member 25 by any means, such as direct attachment, coupling the push pin 36 to the spool valve member 25 by the use of the spring 26 reduces the potential effects of misalignment, and desensitizes movement of the spool valve member 25 in the event that an asymmetrical magnetic flux causes a side force on the push pin 36. The spool valve member 25 moves until the stop surface 47 of the spool valve member 25 is in contact with the stop 46. The second annulus 28b is positioned such that the supply passage 41 is in fluid communication with the piston bore 54, and the body of the spool valve member 25 is positioned such that the drain passage 42 is blocked from fluid communication with the piston bore 54. Thus, actuation fluid will flow from the source of high pressure actuation fluid 12 to the supply passage 41 via the supply line 14. The high pressure actuation fluid can then flow via the second annulus 28b and the actuation passage 42 to the piston bore 14. The high pressure actuation fluid will act upon the piston hydraulic surface 56 causing the intensifier piston 55 and the plunger 58 to advance to their downward position against the bias of the spring 57. After the advanced plunger 58 pressurizes fuel within the fuel pressurization chamber 59, the fuel is delivered to the engine cylinder via the nozzle supply passage 61 and the nozzle outlets 60. The nozzle outlets are controlled by the direct needle control valve 62.

Once the fuel within the fuel pressurization chamber 59 is pressurized and pushed through the nozzle supply passage 62 to the nozzle outlets 60, the electronic control module 24 will stop the flow of electric current through the solenoid coil 31 via the fuel injector communication line 22 and the connector 43. The push pin 36 and the spool valve member 25 will retract upwards due to the bias of the spring 26 until the stop surface 45 of the push pin 36 comes in contact with the plate 44. The plate 44 are preferably made from a relatively hard, nonmagnetic material in order to protect the relatively soft, magnetic material of the stator 32 from wear caused by the repeated impact of the push pin 36. The push pin 36 will then be in its first position in which the actuation passage 41 is in fluid communication with the drain passage 43 via the first annulus 28a and blocked from fluid communication with the supply passage 40. Thus, there will be low pressure acting on the piston hydraulic surface 56 of the intensifier piston 55 causing the intensifier piston 55 and the plunger 58 to retract upward due to the bias of the spring 57. The actuation fluid within the piston bore 54 will drain to the low pressure actuation fluid reservoir 13 via the actuation passage 42 and the drain passage 43. The upward movement of the plunger 58 and intensifier piston 58 will draw fuel into the fuel pressurization chamber 59 to prepare for the next injection event. The process will then repeat itself.

Referring to FIGS. 1, 2 and 4, the application of the present invention within the engine brake 17 will be discussed. When the electronic control module 24 and/or operator determines that an injection event is not desirable, such as when a vehicle having engine 10 is descending a relatively steep hill, electric current is sent through the solenoid coil 31 of the valve assembly 120. The stator 32 surrounding the solenoid coil 31 controls the magnetic flux caused by the energized solenoid coil 31. The magnetic field created by the solenoid coil 31 attracts the armature 35. Although the armature 35 advances toward the solenoid coil 31, the armature 35 does not make contact with the relatively soft magnetic stator 32. Because the armature 35 is attached to the push pin 36, the push pin 36 moves in a corresponding manner with the armature 35 toward to the second position of the push pin 36. Because the spool valve member is operably coupled to the push pin 36, the spool valve member 25 also advances against the bias of the spring 26. As the push pin 36 advances, the outer surface 37 of the push pin 36 slides against the relatively hard nonmagnetic material 39. Thus, the contact between the relatively soft, magnetic stator 32 and the push pin 36 is reduced. When the push pin 36 reaches its second position, the stop surface 47 of the spool valve member 25 will be in contact with the stop 46. The second annulus 28b establishes fluid communication between the supply passage 40 and the actuation passage 41, allowing high pressure actuation fluid to be delivered from the source of high pressure actuation fluid 12 to the fluid passage 71 of the engine brake 17. The high pressure actuation fluid causes piston 72 to advance against the biasing spring 74 moving the engine brake valve member 73 off of the valve seat 75, allowing the engine brake 17 to vent the engine cylinder via the exhaust passage 76. The venting of the engine cylinder rather than the normal injection of pressurized fuel applies a retarding torque on the engine 10.

Once the venting is complete, the electronic control module 24 ceases the flow of electric current through the solenoid coil 32. Therefore, the armature 35 is no longer attracted to the solenoid coil 31 and retracts to its biased position, causing the push pin 36 to return to its first, biased position. The push pin 36 is in its first position when its stop surface 45 is in contact with the plate 44. In return, the spool valve member 25 retracts under the bias of the spring 26. The first annulus 28a now establishes fluid communication between the drain passage 43 and the actuation passage 42 while the body of the spool valve member 25 blocks fluid communication between the supply passage 41 and the actuation passage 42. Because the fluid passage 71 is under low pressure, the piston 72 retracts to its upward position causing the actuation fluid to drain out the drain passage 43 via the actuation passage 42 and the first annulus 28a. Until the electronic control module 24 again energizes the solenoid coil 31, the engine brake 17 is fluidly connected to the low pressure actuation fluid reservoir 13 via the drain line 15 and, thus, remains inactivate.

Overall, the present invention is advantageous because it increases the durability of the solenoid actuator 30. By positioning a relatively nonmagnetic, hard material 39 between the inner surface 33 of the stator 32 and the outer surface 37 of the push pin 36, the present invention reduces or eliminates contact between the inner surface 33 of the stator 32 and the outer surface 37 of the push pin 36. Because the relatively hard, nonmagnetic material preferably comprising the push pin 36 is not in contact with the relatively soft, magnetic material comprising the stator 32 during the movement of the push pin 36, the wear on the stator 32 is decreased, thereby allowing the stator 32 to better guide the movement of the push pin 36 without excessive wear that could undermine its performance. Further, by coating the inner surface 33 of the stator 32 with a thin layer, maybe on the order of two microns, of tungsten carbide, the durability of the solenoid actuator 30 can be increased without increasing the number of parts within the fluid control valve assembly 20, 120. In addition, the present invention is advantageous because the spool valve member 25 is operably coupled to the push pin 36 by a biasing spring 26 without being attached to the push pin 36. Thus, if the magnetic flux caused by the energized solenoid coil 31 is asymmetrical, a pull of the push pin 36 off the centerline 48 would not also cause misalignment of the spool valve member 25 and rubbing between the valve body 29 and the spool valve member 25. The durability of the solenoid actuator 30 is also increased by the helical grooves 38 defined by the outer surface 37 of the push pin 36. These helical grooves 38 aid in removing particles from the guide bore 34 and in lubrication of the guide bore 34, and, thus, decrease the wear on the push pin 36 and the stator 32. Although the application of the present invention has been illustrated within the fuel injector 16 and the engine brake 17, those skilled in the art should appreciate that the present invention is applicable as an electrical actuator for any suitable purpose, such as a hydraulic device using a solenoid actuator.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A hydraulic device comprising:
   a hydraulic device body;
   at least one solenoid actuator positioned at least partially within the hydraulic device body; and comprising a stator being comprised of a relatively soft, magnetic material and including an inner surface defining a guide bore; a solenoid coil being mounted to the stator; a push pin including an outer surface and being movable between a first and a second position within the guide bore; an armature being positioned adjacent to the solenoid coil and being attached to the push pin; and a relatively hard, nonmagnetic material positioned between the inner surface of the stator and the outer surface of the push pin;
   at least one valve including a valve member operably coupled to move with the push pin;
   wherein the relatively hard, nonmagnetic material includes at least one of a coating attached to the inner surface of the stator and a sleeve positioned adjacent to the inner surface of the stator; and
   wherein the relatively hard, nonmagnetic material includes a coating of tungsten carbide attached to the inner surface of the stator.

2. The hydraulic device of claim 1 wherein the outer surface of the push pin defines helical grooves;
   the push pin includes a relatively nonmagnetic material; and
   a spring biasing the valve member into contact with the push pin.

3. The hydraulic device of claim 1 wherein the solenoid actuator is a portion of at least one of a fuel injector and a gas exchange valve;
   the stator is attached to a valve body;
   the valve member is a spool valve member; and
   the valve body and the valve member are portions of a three way valve.

4. A hydraulic device comprising:
   a hydraulic device body;
   at least one solenoid actuator positioned at least partially within the hydraulic device body; and comprising a stator being comprised of a relatively soft, magnetic material and including an inner surface defining a guide bore; a solenoid coil being mounted to the stator; a push pin including an outer surface and being movable between a first and a second position within the guide bore; an armature being positioned adjacent to the solenoid coil and being attached to the push pin; and a relatively hard, nonmagnetic material positioned between the inner surface of the stator and the outer surface of the push pin;
   at least one valve including a valve member operably coupled to move with the push pin; and
   wherein the outer surface of the push pin defines helical grooves.

5. The hydraulic device of claim 4 wherein the push pin includes a relatively nonmagnetic material.

6. A solenoid actuator comprising:
   a stator being comprised of a relatively magnetic, soft material and including an inner surface defining a guide bore;
   a solenoid coil being mounted to the stator;
   a push pin including an outer surface and being movable between a first and second position within the guide bore;
   an armature being positioned adjacent to the solenoid coil and being attached to the push pin; and
   a relatively hard, nonmagnetic material being positioned between the inner surface of the stator and the outer surface of the push pin;
   wherein the relatively hard, nonmagnetic material includes at least one of a coating attached to the inner surface of the stator and a sleeve positioned adjacent to the inner surface of the stator; and
   wherein the relatively hard, nonmagnetic material includes a coating of tungsten carbide attached to the inner surface of the stator.

7. The solenoid actuator of claim 6 wherein the outer surface of the push pin defines helical grooves.

8. The solenoid actuator of claim 7 wherein the push pin includes a relatively nonmagnetic material.

9. A method of increasing the durability of a solenoid actuator comprising a steps of:
   positioning a relatively hard, material between an inner surface of a relatively soft, stator and an outer surface of a push pin, which is operably coupled to a valve member and an armature that is on an opposite side of a plane from the stator;
   wherein the step of positioning includes a step of at least one of coating a relatively hard, nonmagnetic material to an inner surface of the stator and positioning a sleeve comprised of a relatively nonmagnetic, hard material adjacent to the inner surface of the stator; and
   wherein the step of positioning includes a step of coating the inner surface of the stator with tungsten carbide.

10. A valve assembly comprising:
    a valve including a valve body;
    at least one solenoid actuator comprising:
        a stator being comprised of a relatively magnetic, soft material and including an inner surface defining a guide bore;
        a solenoid coil being mounted to the stator;
        a push pin including an outer surface and being movable between a first and second position within the guide bore;
        an armature being positioned adjacent to the solenoid coil and being attached to the push pin; and
        a relatively hard, nonmagnetic material being positioned between the inner surface of the stator and the outer surface of the push pin, and the solenoid actuator being attached to the valve body; and the stator including at least one relatively soft, magnetic impact surface, and the moveable push pin including at least one impact surface;
    a valve member being operably coupled to move with the push pin; and
    a relatively hard, nonmagnetic material being positioned between the at least one relatively soft, magnetic impact surface of the stator and the at least one impact surface of the push pin.

11. The valve assembly of claim 10 wherein the relatively hard, nonmagnetic material includes tungsten carbide.

12. The valve assembly of claim 10 wherein the relatively hard, nonmagnetic material includes a plate positioned between the at least one relatively soft, magnetic impact surface of the stator and the at least one impact surface of the push pin.

13. The valve assembly of claim 12 wherein the push pin is moveable between a first position and a second position; and when the push pin is in the first position, the at least one impact surface of the push pin is in contact with the relatively hard, nonmagnetic material; and when the push pin is in the second position, the at least one impact surface of the push pin is not in contact with the relatively hard, nonmagnetic impact material.

14. The valve assembly of claim 13 wherein the at least one impact surface of the push pin being a relatively hard, nonmagnetic impact surface.

15. The valve assembly of claim 14 wherein the push pin includes two relatively hard, nonmagnetic impact surfaces; and the stator is free of impact surfaces.

16. The valve of claim 15 wherein the relatively hard, nonmagnetic material includes tungsten carbide;
the valve member being a spool valve member; and
the valve body and valve member being a portion of a three way valve.

17. The valve of claim 10 wherein the valve member is a spool valve member.

18. The valve of claim 17 wherein the valve body and the valve member are portions of a three way valve.

* * * * *

UNITED STATES PATENT AND TRADEMARK OFFICE
CERTIFICATE OF CORRECTION

PATENT NO. : 6,959,732 B2
APPLICATION NO. : 10/372568
DATED : November 1, 2005
INVENTOR(S) : Clifford E. Cotton III et al.

It is certified that error appears in the above-identified patent and that said Letters Patent is hereby corrected as shown below:

On the title page, item [73]:

Assignee: delete "Caterpillar Inc., Peoria, IL (US)" and
  insert --Caterpillar Inc., Peoria, IL (US)
      Thomas Magnete GMBH, Herdorf Germany (DE)--

Signed and Sealed this

Twenty-sixth Day of February, 2008

JON W. DUDAS
*Director of the United States Patent and Trademark Office*